July 14, 1959 J. A. ZENEL ET AL 2,895,015

MAGNETIC RECORD TRANSDUCER

Filed Sept. 17, 1953

INVENTORS
Joseph A. Zenel &
Adolph R. Morgan

BY Morris L. Loban
ATTORNEY

United States Patent Office 2,895,015

Patented July 14, 1959

2,895,015

MAGNETIC RECORD TRANSDUCER

Joseph A. Zenel and Adolph R. Morgan, Princeton, N.J., assignors to Radio Corporation of America, a corporation of Delaware Application September 17, 1953, Serial No. 380,854

9 Claims. (Cl. 179—100.2)

Figures 1, 2, 3, 4, 5:
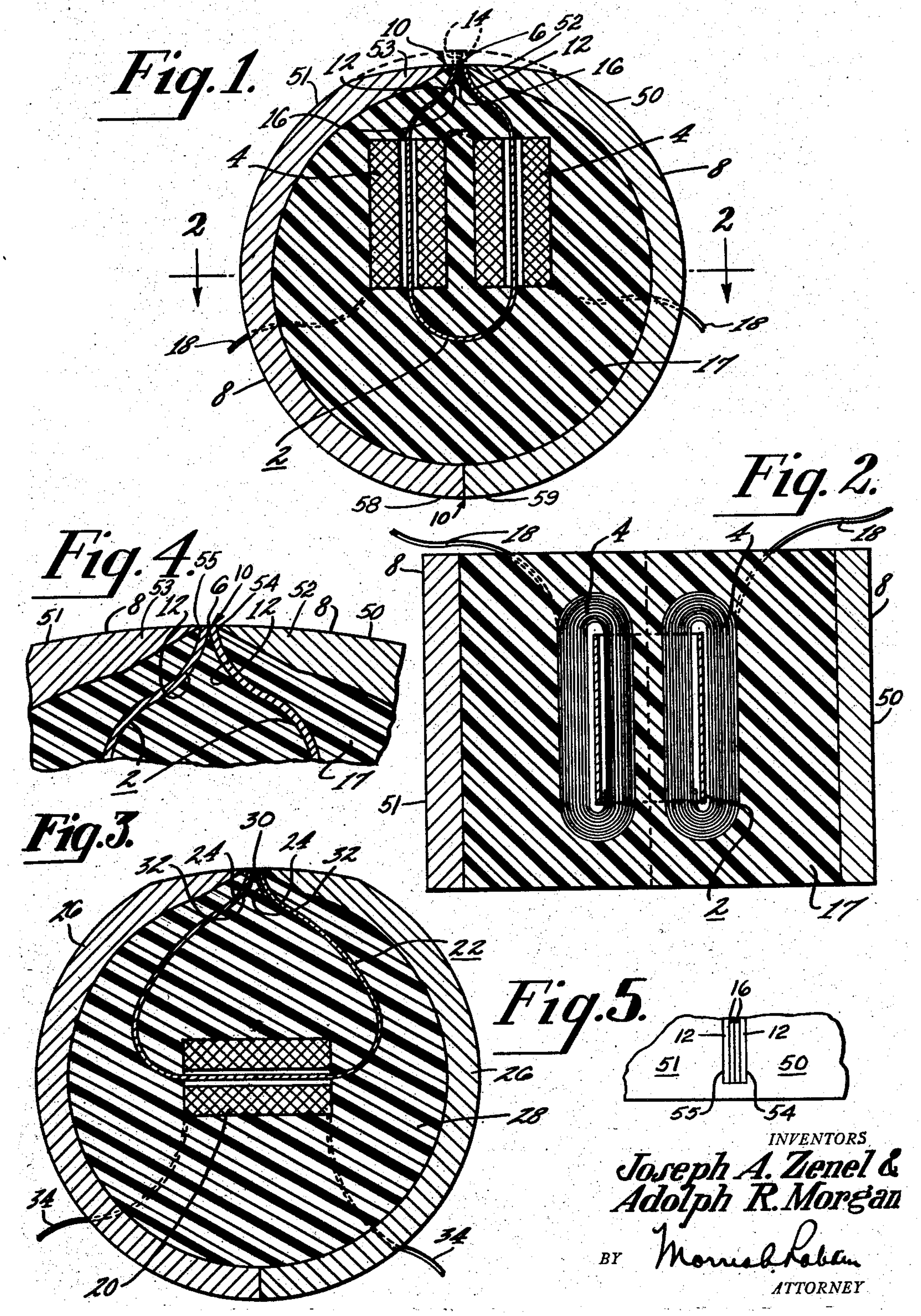

This invention relates to the art of magnetic recording, and more particularly to improved magnetic record transducers.

In the art of magnetic recording, efforts have been made toward providing means for transducing signals of higher and higher frequencies. An ultimate goal is to provide a transducer capable of handling signals of frequencies comparable to those used in transmitting television signals. Such a transducer would permit the storage of television information on magnetic record tapes obviating the complex systems used in the optical recording of television program material. Transducers heretofore used have been, for one reason or another, not suitable for use in the very high frequency field.

It is, therefore, an object of the present invention to provide an improved magnetic record transducer the characteristics of which render it suitable for use in the very high frequency range.

Another object of the present invention is to provide an improved magnetic record transducer as set forth which is characterized by simplicity of structure and operation.

In accomplishing these and other objects, there has been provided, in accordance with the present invention, a transducer which comprises a core made of a thin ribbon of high magnetic permeability metal foil which is threaded through suitable field coil means and then bent to form a substantially closed magnetic loop. A housing of non-magnetic metal encircles the core structure and its associated coil and clamps the ends of the ribbon-like core member together to define a signal translating gap, such as may be a region of higher magnetic reluctance than the reluctance of the remainder of the core loop, rather than an actual physical separation of the ends of the core loop. The cavity defined by the housing member is filled with a plastic embedment which surrounds the core and coil structure.

A better understanding of this invention may be had from the following detailed description when read in connection with the accompany drawing in which, Fig. 1 is an elevational view, in cross-section, of a transducer constructed in accordance with the present invention, Fig. 2 is a view taken along the line 2—2 of Fig. 1 and looking in the direction of the appended arrows, Fig. 3 is a view similar to that of Fig. 1 showing a somewhat different form of transducer also embodying the present invention, Fig. 4 is a fragmentary view, in cross-section and on an enlarged scale, showing details of the area of the signal gap of one form of transducer embodying the invention, and Fig. 5 is a fragmentary top view of the transducer shown in Fig. 1.

Referring now to the drawings in more detail there is shown in Figs. 1, 5 and 2 a transducer which comprises a core member 2 made of a thin ribbon of high permeability magnetic metal foil. A balanced pair of signal coils 4 surround the core member in inductive energy transfer relationship. The ribbon of the core member is bent into a loop having substantially parallel sides and the free ends are brought together to define a signal translating gap 6.

Encircling the coil and core structure is a housing member 8. The housing member 8 is formed of a pair of semi-cylindrical elements 50 and 51 made of non-magnetic material such, for example, as stainless steel. The two elements 50, 51 are positioned in face-to-face relation with their opposite ends 52 and 53 and 58 and 59 abutting at junctions to form a substantially cylindrical member. At one of the abutting junctions 10 between the two elements 50 and 51, the inner edges 54 and 55 of the elements 50 and 51, respectively, are tapered toward the gap defined by the abutting ends 52 and 53. The free or polar ends 12 of the core member 2 are clamped between these tapered edges 53 and 54 of the housing member 8. Thus arranged, the extremities of the ribbon are pinched together to form parallel portions 14. The housing member 8 is then ground down, or otherwise dressed, in the vicinity of the gap until the parallel portions of the ends of the core member just begin to deviate from parallelism. There remains a portion of the extremities of the core member which then abuts with a line contact which defines a signal translating gap 6. As shown in Fig. 1 and Fig. 5, and prior to assembly, the extremities of the core member may be plated with a suitable non-magnetic, high conductivity material such as copper or silver. When such a core member is assembled into a transducer, as shown in Figs. 1 and 3, the plating 16 on the extremities constitutes a non-magnetic gap spacer of substantially negligible thickness. The cavity defined by the inner portion of the housing is filled with a plastic material 17 which surrounds the core and coil structure.

In a transducer, such as that shown in Figs. 1 and 2, the pair of coils 4 are serially connected with respect to signals applied through external lead wires 18. Such a transducer has been found suitable for recording and reproducing very high frequency signals. In a transducer constructed in accordance with the foregoing description the outer diameter of the housing member was approximately ¼ of an inch. The core and coil structure were proportionately smaller. The thickness of the foil of which the core was made was approximately .002 of an inch. Because of the small quantity of magnetic material used in the core, eddy current and hysteresis losses do not place an upper limit on the effectiveness on the transducer at very high frequencies.

It has also been found that the non-magnetic gap spacer, such as the plating 16 shown in Fig. 1 may be eliminated, since the line contact between the dressed ends of the core member present a higher reluctance to magnetic flux than does the shunt path through the magnetic coating on a tape placed in juxtaposition thereto because the area at the abutting ends of the core is almost zero. Such an arrangement is shown on a large scale in the fragmentary view, Fig. 4. The length of the gap in this type of head is limited only by the roughness of the surface of the ribbon of the core material. Since the contact is a corner, or line contact of two non-parallel surfaces, the leakage flux is negligible.

In Fig. 3 there is shown a transducer embodying the invention but showing a head designed primarily for a different purpose. The single field coil 20 is inductively coupled to a core member 22 similar to that shown in Fig. 1. The ends 24 of the core member are similarly clamped between the extremities of a pair of semi-cylindrical housing elements 26 and the cavity defined by the housing is filled with a plastic potting material 28. Here, too, the signal gap 30 may or may not be defined by a gap spacer of plating material 32 on the ends 24 of the core member 22. Such a transducer has been found suitable for use as a signal erasing head. Because of the small quantity of magnetic material and the configuration of the core member adjacent the signal gap, leakage flux is minimized and a relatively small current through the field coil can produce sufficient flux for effective erasing. If direct current is applied through the leads 34, the remnant flux density in such a core member, because of the small quantity of magnetic material used, is insufficient to cause inadvertent or unwanted erasing when no current is passing through the field coil.

Thus there has been provided an improved magnetic record transducer which is characterized by simplicity of construction and operation and is capable of handling signals in the very high frequency range, such as used in television.

What is claimed is:

1. A magnetic record transducer comprising a core member of thin, high magnetic permeability metal foil, field coil means inductively coupled to said core member, said core member having polar ends, means for supporting said core member with the extremities of said polar ends abutting in substantially a line contact to define a signal gap, said supporting means comprising non-magnetic housing member defining a cavity and encircling said core member and said coil means, and said housing having a transverse split therein, said polar ends being disposed within said split clamped together by said housing with said extremities thereof abutting so that the area at the junction therebetween is substantially zero.

2. A magnetic record transducer comprising a core member of thin, high magnetic permeability metal foil, field coil means inductively coupled to said core member, said core member having polar ends, means for supporting said core member with the extremities of said polar ends abutting in substantially a line contact to define a signal gap, said supporting means comprising a housing member defining a cavity and encircling said core member and said coil means, said housing member including a pair of similar elements arranged in face-to-face relation with their corresponding ends abutting each other on one side thereof and a different one of said polar ends on the opposite side thereof, said core comprising a ribbon of said foil the polar ends of which are clamped between said abutting ends of said housing with said extremities thereof abutting so that the area at the junction therebetween is substantially zero, and a plastic embedment filling said cavity and surrounding said core member and said coil means.

3. A magnetic record transducer comprising a core member of thin, high magnetic permeability metal foil, field coil means inductively coupled to said core member, said core member comprising a ribbon of said foil threaded through said coil means and bent into a substantially closed loop, means for supporting said core member with the extremities of the ends of said ribbon thereof abutting in substantially a line contact to define a signal gap, said supporting means comprising a housing member defining a cavity and encircling said core and coil means, said housing member including a pair of similar non-magnetic elements having ends arranged in face-to-face relation, said elements being tapered to provide edges at the extremities of said ends of smaller area than the cross-sectional area of said elements, and said ends of said ribbon being clamped between abutting edges of said housing elements.

4. A magnetic record transducer comprising a core member of thin, high magnetic permeability metal foil, field coil means inductively coupled to said core member, said core member comprising a ribbon of said foil threaded through said coil means and bent into a substantially closed loop with the ends thereof defining a signal gap, said ends of said core member having the extremities thereof abutting each other in substantially a line contact and, a substantially cylindrical housing member defining a cavity and encircling said core and coil means, said housing member including a pair of semi-cylindrical elements arranged in face-to-face relation with their corresponding ends abutting, the inner surface of each of said elements being tapered toward said outer surface at one end thereof to provide each of said elements with at least one tapered end, said ends of said ribbon being clamped between abutting one of said tapered ends of said housing elements.

5. A magnetic record transducer comprising a core member of thin, high magnetic permeability metal foil, a pair of signal coils inductively coupled to said core member, said core member having polar ends, means for supporting said core member with the extremities of said polar ends abutting in substantially a line contact to define a signal gap, said supporting means comprising a substantially cylindrical housing member defining a cavity and encircling said core member and said associated coils, said housing member including a pair of semi-cylindrical elements arranged in face-to-face relation with their corresponding ends abutting, the polar ends of said core being clamped between abutting ends of said housing with the extremities thereof providing a signal gap region of much higher magnetic reluctance than said foil, and a plastic embedment filling said cavity and surrounding said core member and said associated coils.

6. Apparatus for magnetic recording or reproducing comprising a looped ribbon of magnetic material providing a magnetic core, the ends of said ribbon having adjacent edges facing each other and disposed in contact with each other, said ends of said ribbon diverging from said adjacent edges whereby said contact between said edges is of substantially zero area and of high reluctance at an operating range of frequency of said apparatus.

7. Apparatus as claimed in claim 6 wherein portions of said ends of said ribbon adjacent said edges are covered with a thin layer of non-magnetic material.

8. A magnetic transducer for cooperation with a magnetic record comprising a core structure including a looped ribbon of magnetic material, a clamp having a pair of clamping jaws clamping together the free ends of said ribbon at the edges thereof to define an area of contact between said edges of said ribbon which is substantially zero whereby the reluctance of said ribbon is much greater than the reluctance through said magnetic record when passing over said ends of said ribbon.

9. The invention according to claim 8 wherein said clamping jaws are tapered inwardly toward the ends thereof.

References Cited in the file of this patent

UNITED STATES PATENTS

| | | |
|---|---|---|
| 2,469,444 | Roys | May 10, 1944 |
| 2,628,286 | Rettinger | Feb. 10, 1953 |
| 2,674,659 | Buhrendorf | Apr. 6, 1954 |
| 2,693,508 | Lord | Nov. 2, 1954 |
| 2,754,569 | Kornei | July 17, 1956 |

FOREIGN PATENTS

| | | |
|---|---|---|
| 661,428 | Great Britain | Nov. 21, 1951 |
| 169,056 | Austria | Oct. 10, 1954 |